(12) United States Patent
Yamamoto

(10) Patent No.: US 6,961,290 B2
(45) Date of Patent: Nov. 1, 2005

(54) APPARATUS FOR LOADING AN OPTICAL DISK INTO A CASE

(75) Inventor: Kaoru Yamamoto, Kyoto (JP)

(73) Assignee: Kyoto Seisakusho Co., Ltd., Kyoto (JP)

( * ) Notice: Subject to any disclaimer, the term of this patent is extended or adjusted under 35 U.S.C. 154(b) by 583 days.

(21) Appl. No.: 10/254,954

(22) Filed: Sep. 24, 2002

(65) Prior Publication Data

US 2004/0017737 A1    Jan. 29, 2004

(30) Foreign Application Priority Data

Jul. 26, 2002   (JP) .............................. 2002-217443

(51) Int. Cl.⁷ ............................................. G11B 7/085
(52) U.S. Cl. .............................. 369/30.32; 369/30.74; 53/473
(58) Field of Search .................. 369/30.32, 30.28, 369/30.1, 30.48, 30.74, 30.75, 30.94, 30.64; 53/473, 474, 238, 564, 492

(56) References Cited

U.S. PATENT DOCUMENTS 5,816,028 A * 10/1998 Zaniboni ..................... 53/445
6,118,751 A * 9/2000 Hanakawa et al. ...... 369/30.74
6,233,909 B1 * 5/2001 Onishi ......................... 53/473
6,418,703 B1 * 7/2002 Yamamoto ................... 53/564

FOREIGN PATENT DOCUMENTS

JP           2001-48118        2/2001

\* cited by examiner

*Primary Examiner*—Ali Neyzari
(74) *Attorney, Agent, or Firm*—W. F. Fasse; W. G. Fasse

(57) ABSTRACT

An optical disk loading apparatus (1) for unloading a case (10) from a case stacking device (3) where a plurality of cases (10) are stacked with each case (10) closed and placed upstandingly, transferring the case (10) via a conveyor (2) and loading optical disks (D1, D2) into the case (10). The optical disk loading apparatus (1) includes a case unloading and inverting device (4) that unloads a case (10) from a case supplying conveyor (30) of the case stacking device (3) and inverts the case (10) 90 degrees upstandingly, a case opening device (5) that opens the inverted case (10) to a flat state at its inverted position, and optical disk loading devices (6, 6') that load optical disks (D1, D2) into the opened case (10). Since the case opening device (5) can be placed at a position in the vicinity of an upstream end of the conveyor (2), the whole length of the conveyor (2) is shortened, thereby shortening the whole length (L) of the optical disk loading apparatus (1).

8 Claims, 10 Drawing Sheets

APPARATUS FOR LOADING AN OPTICAL DISK INTO A CASE

BACKGROUND OF THE INVENTION

The present invention relates to an apparatus for automatically loading an optical disk such as CD (i.e. Compact Disk), DVD (i.e. Digital Video Disk) or the like in a plastic case. More specifically, it relates to a structural improvement for downsizing the apparatus.

The assignee to the present application proposed an optical disk loading machine for automatically loading an optical disk in a case, as shown in Japanese patent application publication No. 2001-48118.

This optical disk loading apparatus is comprised of a case unloading and supplying device to unload a case from a case stacking station where a plurality of closed cases are stacked upstandingly and to supply the case to a case conveyor, a case opening device to open the case into a flat, developed state, and an optical disk loading device to load an optical disk into the case.

In operation, a case that has been supplied to the case conveyor by the case unloading and supplying device is placed lyingly or horizontally on the conveying surface of the case conveyor. The case is transferred to the case opening device in the next process with its lying state maintained, as shown in FIG. 1 of the publication No. 2001-48118.

Also, it is not clearly shown in the publication, but an examining device is provided at a backward position of the optical disk loading device to examine whether the optical disk is loaded in the case or not.

In another prior art optical disk loading apparatus, which loads two optical disks in a case, there are provided a first optical disk loading device to load a first optical disk and a second optical disk loading device to load a second optical disk, which are placed on the same side of the case conveyor.

Thus, the length of the conventional optical disk loading apparatus is long along the case conveying direction. A need therefore exists to reduce the size of the apparatus by shortening the whole length of the apparatus.

An object of the present invention is to provide an optical disk loading apparatus that can shorten the whole length of the apparatus to make the apparatus compact.

SUMMARY OF THE INVENTION

The present invention is directed to an apparatus for loading an optical disk into a case. A case is openable and closable and has a transparent cover sheet attached on the front surface thereof. The apparatus includes a case stacking device having a plurality of closed cases stacked upstandingly, a case conveyor to convey a case, a case unloading and inverting device to unload a case one by one from the case stacking device and to invert the case 90° in an upstanding state, a case opening device to open and develop or spread open the case into a flat state at an inverted position, a title sheet inserting device to insert a title sheet into the transparent cover sheet of the case, a booklet loading device to load a booklet into the case, and an optical disk loading device to load an optical disk into the case.

In operation, a case in the case stacking device is unloaded and inverted 90° in an upstanding state by the case unloading and inverting device. At this inverted position, the case is opened and spread open by the case opening device. Thus, opening of the case can be conducted in the vicinity of the upstream end of the case conveyor. As a result, the whole length of the case conveyor and thus the apparatus can be shortened, thereby reducing the size of the apparatus.

To the contrary, in the prior art apparatus, as above-mentioned, a case unloaded from the case stacking device and supplied to the case conveyor by the case unloading and supplying device is placed lyingly or horizontally on the conveying surface of the case conveyor. Then, the case is transferred to the case opening device at the next station as its lying or horizontal state maintained. As a result, the distance between the upstream end of the case conveyor and the position of the case opening device becomes longer, thereby making the whole length of the case conveyor and thus the apparatus longer.

In the present invention, the apparatus is constructed in such a way that a case unloaded from the case stacking device is inverted upstandingly without being laid down on the case conveyor, and is opened at the inverted position. Thus, the case opening device can be placed in the vicinity of the upstream end of the case conveyor, thereby shortening the whole length of the apparatus.

Then, the title sheet inserting device inserts a title sheet into the transparent cover sheet of the case. Thereafter, the booklet loading device loads a booklet into the case and the optical disk loading device loads an optical disk into the case.

The case unloading and inverting device may be composed of a first and second supporting shafts located away from each other, a block member having a lateral through hole and rotatably supported by the second shaft, a rod member slidably supported in the lateral through hole of the block member, a first link member fixedly connected to the first supporting shaft, a second link member fixedly connected to the distal end portion of the rod member and rotatably connected to the distal end of the first link member through a connecting member, and a case holding portion fixedly connected to the distal end of the rod member and having a suction pad to suction-hold a case.

When the first supporting shaft rotates, the first link member rotates along with the first supporting shaft. Then, the second link member and the rod member fixed thereto moves laterally through the connecting member provided at the distal end of the first link member. Thus, the rod member slides into the through hole of the block member and the block member rotates around the second supporting shaft. In such a manner, the case holding portion moves around the first supporting shaft. When the first supporting shaft rotates 90°, a case held by the suction pad of the case holding portion is inverted 90° in the upstanding state.

The optical disk loading device may be composed of a first optical disk loading device that is provided on one side of the case conveyor and loads a first optical disk into a case, and a second optical disk loading device that is provided on the other side of the case conveyor and loads a second optical disk into the case.

In this case, the first and second optical disk loading devices are placed on the opposite sides of the case conveyor. Thus, the first and second optical disk loading devices can be disposed in close proximity to each other or in an overlapped state along the conveying direction of the case conveyor. As a result, the occupying length of the first and second optical disk loading devices can be reduced along the conveying direction of the case conveyor. In such a way, the whole length of the case conveyor and thus the apparatus can be shortened, thereby making the whole apparatus compact.

To the contrary, in a conventional apparatus, both of the first and second optical disk loading devices are placed on the same side of the case conveyor. Thus, the first and second optical disk loading devices cannot be disposed in an overlapped state or in close proximity to each other. As a result, it was difficult to reduce the occupying length of the first and second optical disk loading devices along the conveying direction of the case conveyor.

The optical disk loading device may include a sensor to detect loading of the optical disk into the case. In this case, since an inspection as to whether the optical disk is loaded into the case or not can be conducted at the time of loading of the optical disk, an inspecting station does not need to be provided, thereby reducing the whole length of the case conveyor and thus the apparatus.

The optical disk loading device may include a suction pad to suction-hold an optical disk, a movable rod to move the suction pad upwardly and downwardly, and a position detecting sensor to detect the height of the movable rod. In this case, whether the optical disk is loaded into the case or not is detected according to the height of the movable rod, the detection can be securely conducted.

The case stacking device may be comprised of a case supplying conveyor provided slantly in such a way that the downstream end is lower than the upstream end and adapted to supply a case to the case unloading and inverting device, a first feeding conveyor having a first feeding surface tilted in such a way that the upstream end is lower than the downstream end and adapted to feed a plurality of closed and upstanding cases to the case supplying conveyor, and a second feeding conveyor having a second feeding surface extending to the case supplying conveyor and perpendicular to the first feeding surface of the first feeding conveyor and operating synchronized with the first feeding conveyor.

In this case, in synchronized operation with the first and second feeding conveyors, the cases stacked on the first feeding conveyor is transferred to the case supplying conveyor. Then, the case that has been transferred and placed on the case supplying conveyor is moved to the case unloading and inverting device.

Moreover, in this case, since the upstream end of the first feeding conveyor is lower than the downstream end, it becomes easy for an operator to load or place cases onto the first feeding surface of the first feeding conveyor from the upstream end side.

BRIEF DESCRIPTION OF THE DRAWINGS

For a more complete understanding of the invention, reference should be made to the embodiments illustrated in greater detail in the accompanying drawings and described below by way of examples of the invention. In the drawings, which are not to scale.

DETAILED DESCRIPTION OF THE PREFERRED EMBODIMENTS

Figure 1:
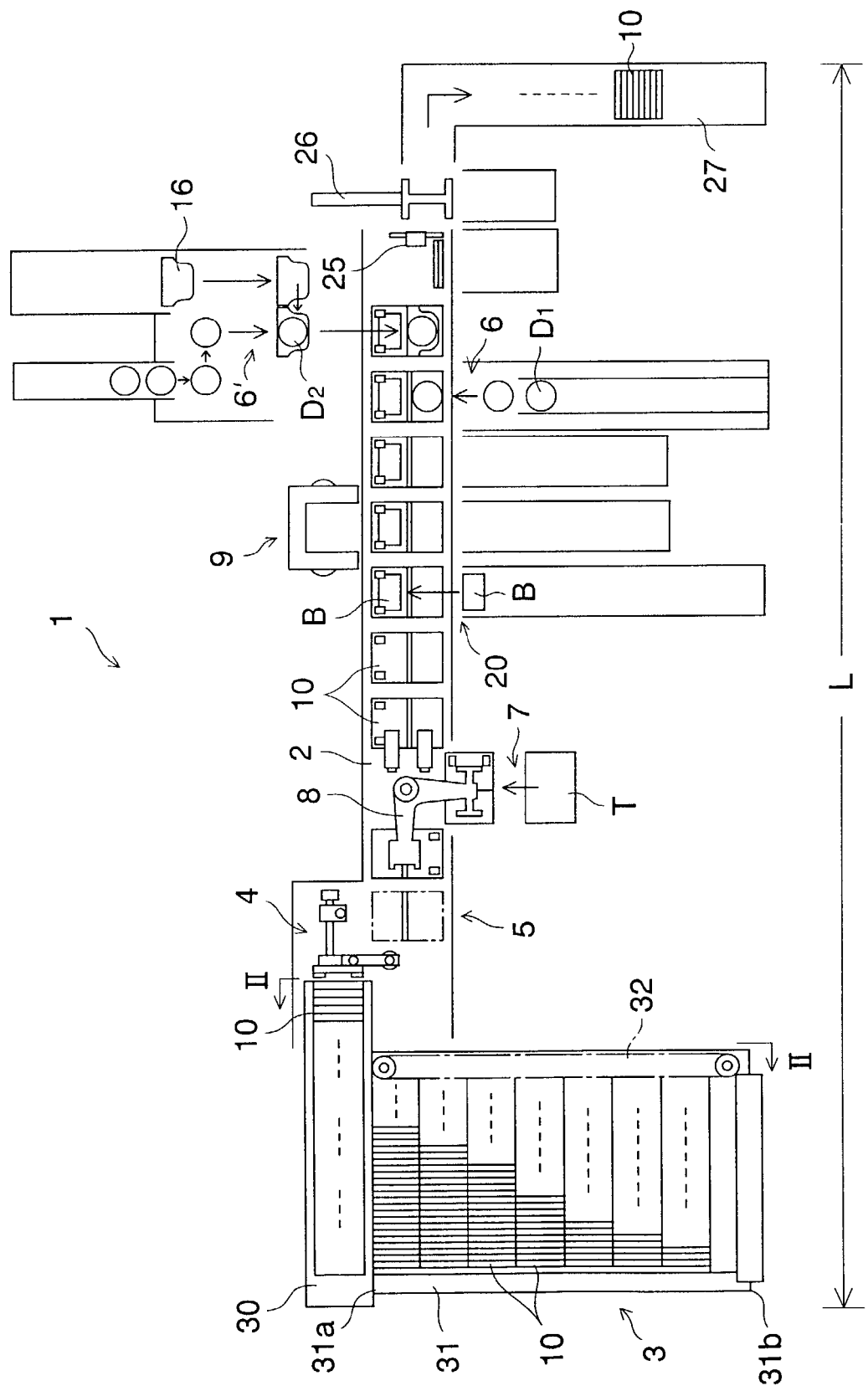
FIG. 1 is a top plan schematic view of an optical disk loading apparatus according to one embodiment of the present invention.

Referring now to the drawings, FIG. 1 shows an optical disk loading apparatus 1 according to an embodiment of the present invention. The optical disk loading apparatus 1 includes a case conveyor 2 to convey a case 10 in a right direction of the drawing and a case stacking device 3 having a multiple of cases 10 stacked thereon and provided at an upstream end of the case conveyor 2. The optical disk loading apparatus 1 further includes a case unloading and inverting device 4 to unload a case 10 one by one from the case stacking device 3 and invert it 90 degrees, a case opening device 5 to open the case 10 into a developed state at its inverted position, and a first and second optical disk loading device 6, 6' to load a first and second optical disk D1, D2, respectively into the opened case 10.

Figure 12:
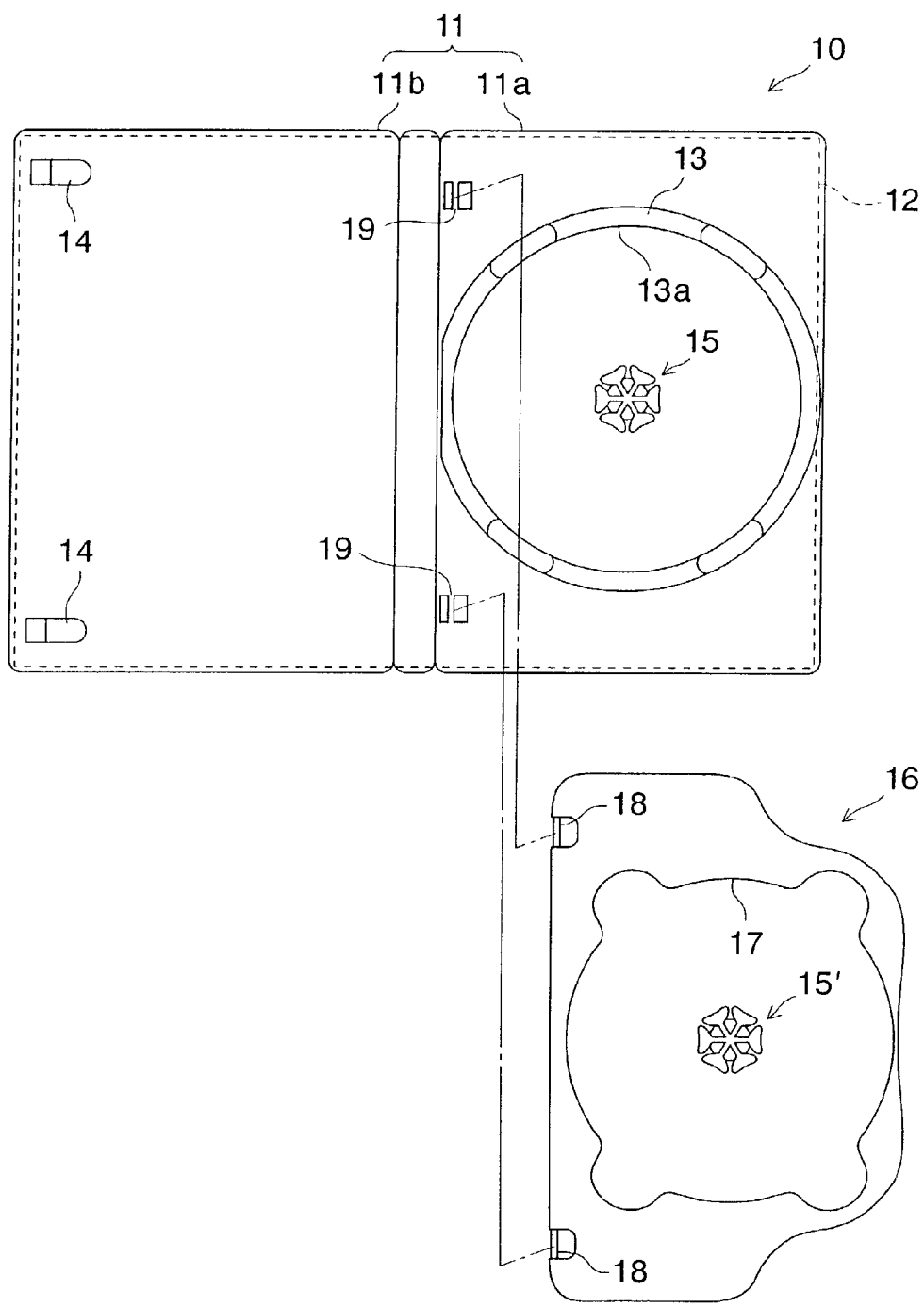
FIG. 12 is a top plan view of a case that illustrates an open and developed state prior to loading a tray.

As shown in FIG. 12, the case 10 is a foldable, boxed-shaped case and formed of a case body 11 and a transparent cover sheet 12 attached on the front side surface of the case body 11. On one body portion 11a of the case body 11, a bulge 13 extending circumferentially in a band-shape is formed and the inner circumferential surface 13a of the bulge 13 defines a round hole to receive a first optical disk D1. On a central portion of the body portion 11a is formed a boss 15 to detachably engage with a central hole of the first optical disk D1. On the other body portion 11b of the case body 11, a pair of engaging claws 14 are provided to engage with a relatively large-sized booklet or a relatively small-sized coupon.

Also, a tray 16 is provided on the case body 11. The tray 16 has a recess 17 to receive a second optical disk D2. One end side of the tray 16 has a pair of engaging portions 18 to engage with a corresponding pair of engaging portions 19 of the body portion 11a of the case body 11.

Turning back to FIG. 1, the case stacking device 3 has a case supplying conveyor 30 to supply a case 10 to the case unloading and inverting device 4. The case supplying conveyor 30 is tilted in such a way that the downstream end (or the right side end in FIG. 1) is lower than the upstream end (or the left side end in FIG. 1).

Figure 2:
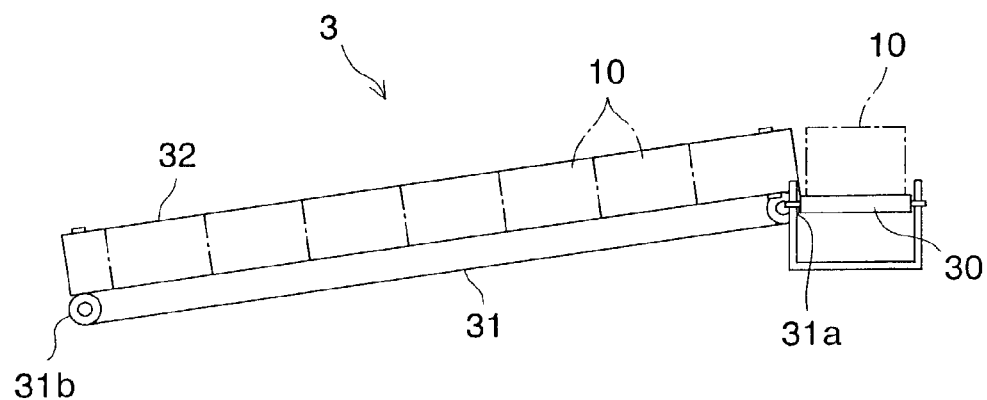
FIG. 2 is a side view of FIG. 1 taken along line II—II.

The case stacking device 3 further has a first and second feeding conveyor 31, 32 to feed the cases 10 to the case supplying conveyor 30. A feeding surface of the first feeding conveyor 31 forms a table surface on which a multiple of closed cases 10 are stacked upstandingly. The downstream end 31a of the feeding surface of the first feeding conveyor 31 is provided along the feeding surface of the supplying conveyor 30, and the upstream end 31b is placed at a lower position than the downstream end 31a, shown in FIG. 2. That is, the feeding surface of the first feeding conveyor 31 is tilted downwardly toward the upstream end 31b.

The feeding surface of the second feeding conveyor 32 extends to the case supplying conveyor 30, perpendicularly to the feeding surface of the first feeding conveyor 31. Also, the second feeding conveyor 32 operates synchronously with the first feeding conveyor 31.

Figure 3:
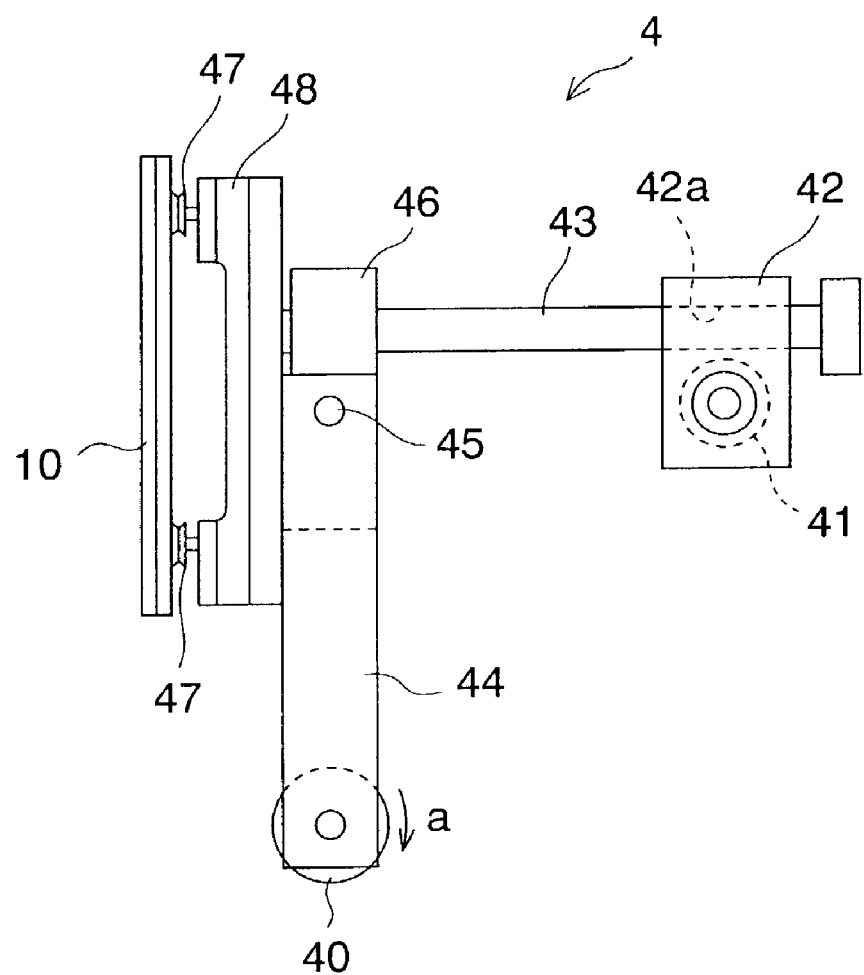
FIG. 3 is a top plan view of a case unloading and inverting device of the optical disk loading apparatus.

As shown in FIG. 3, the case unloading and inverting device 4 includes a first rotatable supporting shaft 40 extending upwardly or generally vertically, and a second supporting shaft 41 located away from the first supporting shaft 40 and extending upwardly or generally vertically. The first supporting shaft 40 is drivingly connected to the drive (not shown).

The case unloading and inverting device 4 further includes a block member 42 rotatably supported at the distal end of the second supporting shaft 41 and having a through hole 42a extending laterally or generally horizontally, a rod member 43 slidably supported in the through hole 42a of the block member 42, a first link member 44 fixedly connected to the distal end of the first supporting shaft 40, a second link member 46 fixedly connected to the distal end portion of the rod member 43 and rotatably connected to the distal end of the first link member 44 through a connecting member 45, and a case holding portion 48 fixedly connected to the distal end of the rod member 43 and having a suction pad 47 to suction-hold the case 10.

Figure 6:
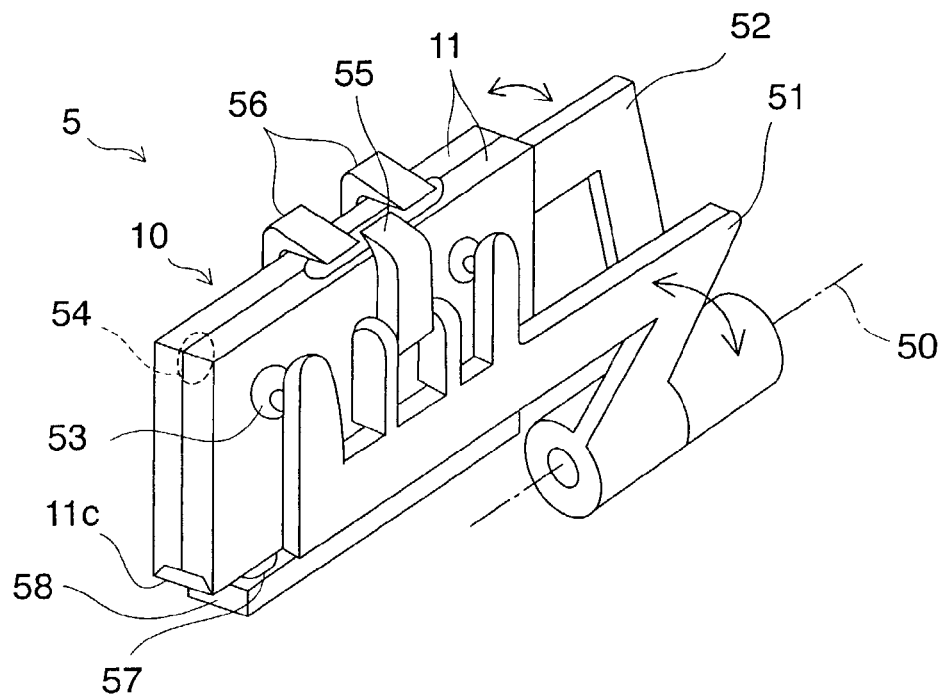
FIG. 6 is a perspective view of the case opening device of the optical disk loading apparatus.

The case opening device 5, shown in FIG. 6, includes a pair of levers 51, 52 adapted to rotate around an axial center line 50. The levers 51, 52 have suction pads 53, 54, respectively, to suction-hold the case 10 from its opposite sides. Also, the levers 51, 52 have claw members 55, 56 to engage with an end surface of the case body 11 to unlock the case 10. Under the levers 51, 52, a member 58 with a suction pad 57 is provided to suction-hold the back portion 11c of the case 10 from below.

Figure 8:
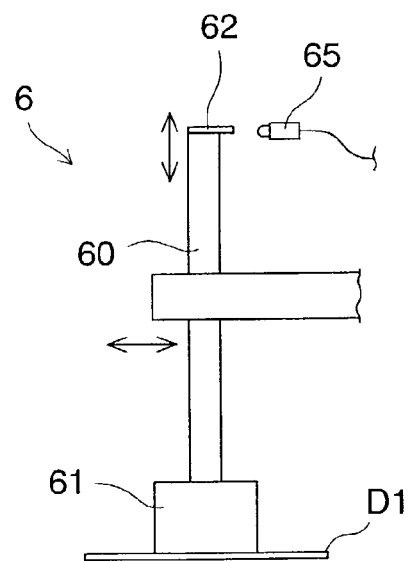
FIG. 8 is a side schematic view of the disk loading device of the optical disk loading apparatus.

The first optical disk loading device 6, shown in FIG. 8, includes a movable rod 60 adapted to travel upwardly and downwardly or vertically, and a suction portion 61 provided at the lower end of the movable rod 60 and having a suction pad to suction-hold the first optical disk D1. Beside the upper end of the movable rod 60, a sensor 65 is provided to detect that an optical disk is loaded into the case 10 by detecting the height of the detection plate 62 attached to the upper end of the movable rod 60. The movable rod 60 is also adapted to travel in a horizontal direction.

The second optical disk loading device 6' to load a second optical disk D2 into the tray 16 of the case 10 has a structure similar to the first optical disk loading device 6, and thus, detailed explanation of the second optical disk loading device 6' is not described here.

As shown in FIG. 1, the first optical disk loading device 6 is placed on one side of the case conveyor 2 and the second optical disk loading device 6' is placed on the other side of the case conveyor 2. These first and second optical disk loading devices 6, 6' are disposed in close proximity to each other or in an overlapped state along the carrying direction of the case conveyor 2.

Figure 9:
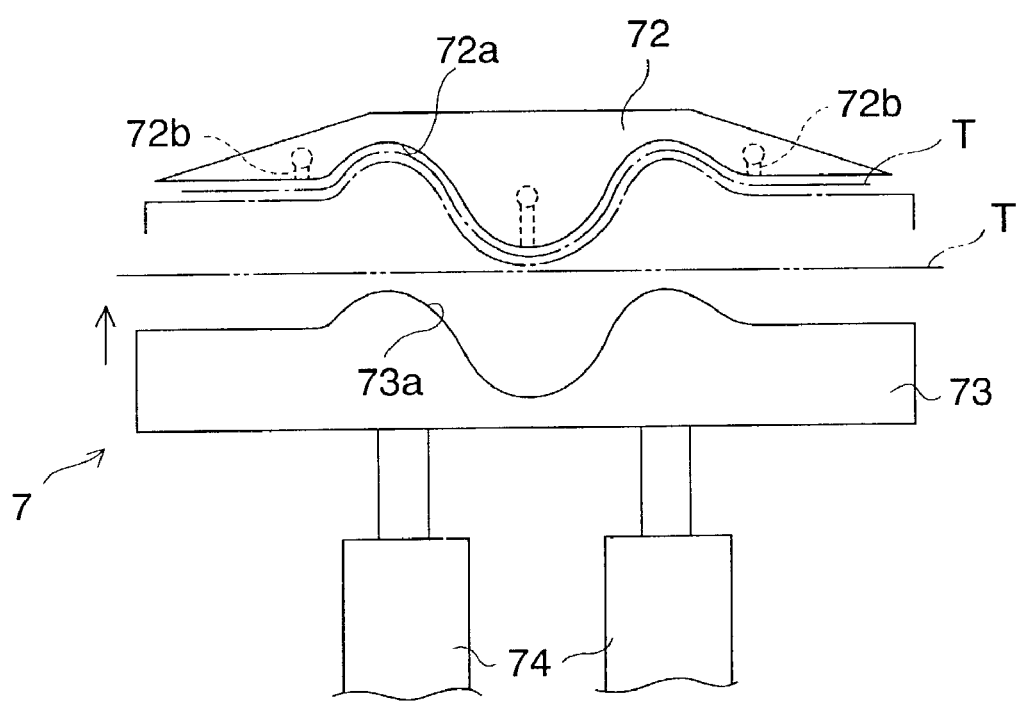
FIG. 9 is a side view of the title sheet inserting device of the optical disk loading apparatus.

Also, the optical disk loading apparatus 1 includes a title sheet inserting device 7 to insert a title sheet T between the transparent cover sheet 12 and the case body 11 of the case 10. The title sheet inserting device 7, shown in FIG. 9, has an upper mold 72 and a lower mold 73 that are vertically contraposed. The lower mold 72 is vertically movable through actuators 74. The upper and lower molds 72, 73 have wavy corrugated contact surfaces 72a, 73a, respectively, to sandwich a title sheet T therebetween to form it into a wavy, corrugated shape. Also, the upper mold 72 has a plurality of air passages 72b to suction-hold the title sheet T on the contact surface 72a.

In FIG. 1, over the case conveyor 2, a swingable arm 8 is provided to transfer the case 10 on the case conveyor 2 to the title sheet insertion station and to transfer the case 10 back on the case conveyor 2 after completion of the title sheet insertion.

The optical disk loading apparatus 1 includes a booklet loading device 9 to load a booklet B into the engaging claws 14 of the case 10. The booklet loading device 9, shown in FIG. 11, has a suction pad 91 to suction-hold a booklet B stacked on a container 90, and a piston 92 to pinch a booklet held by the suction pad 91 between a piston rod 92a and a base plate 93, which is connected to a movable rod 94 through a connecting plate 95.

The optical disk loading apparatus 1 further includes a case closing device 25 to close the case 10 after completion of the optical disk loading, a pusher 26 to discharge defectives, and a conveyor 27 to carry acceptable cases to the next process.

Next, the operation of the above-mentioned optical disk loading apparatus will be described hereinafter.

First, each case 10 stacked on the first feeding conveyor 31 of the case stacking device 3 is carried to the case supplying conveyor 30 by synchronous operation with the first and second feeding conveyors 31, 32. In addition, supply of the cases 10 to the feeding surface of the first feeding conveyor 31 is conducted by an operator from the upstream end 31b of the first feeding conveyor 31. In this case, since the upstream end 31b of the first feeding conveyor 31 is lower than the downstream end 31a, shown in FIG. 2, case supplying work onto the first feeding conveyor 31 becomes easy and working efficiency improves.

Then, a case 10, which has been carried to the downstream end of the case supplying conveyor 30, is unloaded from the case supplying conveyor 31 and inverted 90 degrees by the case unloading and inverting device 4. At this time, the case 10 is placed at the position of the case opening device 5.

The case unloading and inverting device 5 operates as follows:

From a condition shown in FIG. 3 where a case 10 is suction-held by the suction pads 47 of the case holding portion 48, as the first supporting shaft 40 rotates in the direction of the arrow mark a, the first link member 44 rotates in the same direction.

Figure 4:
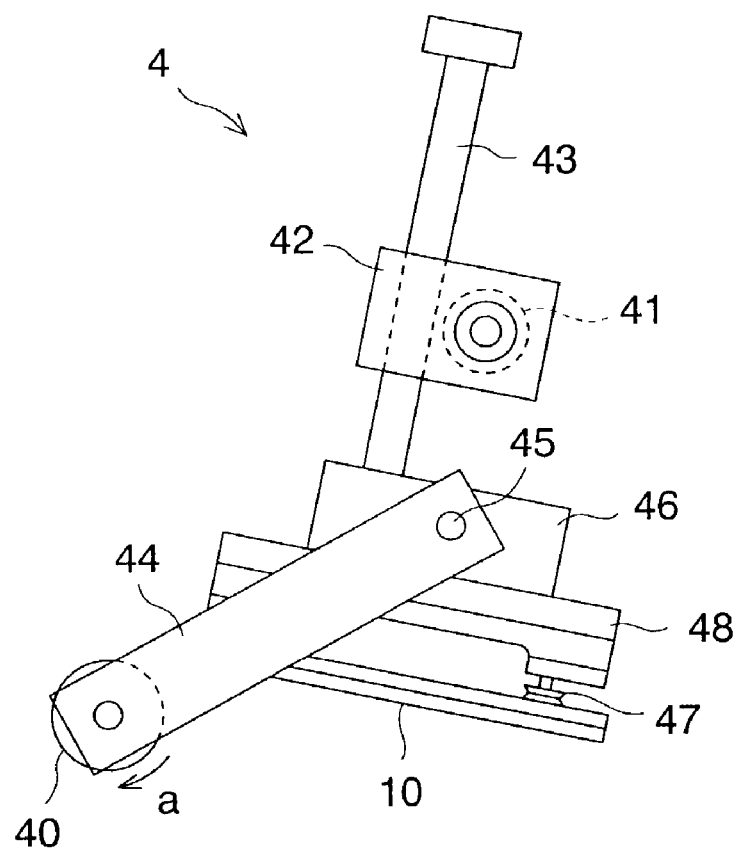
FIG. 4 is a schematic illustrating operation of the case unloading and inverting device of FIG. 3.

Then, the rod member 43 slides into the through hole 42a of the block member 42 via the second link member 46 connected by the connecting member 45 at the distal end of the first link member 44, and the block member 42 rotates around the second supporting shaft 41. Thereby, shown in FIG. 4, the case supporting portion 48 moves around the first supporting shaft 40.

Figure 5:
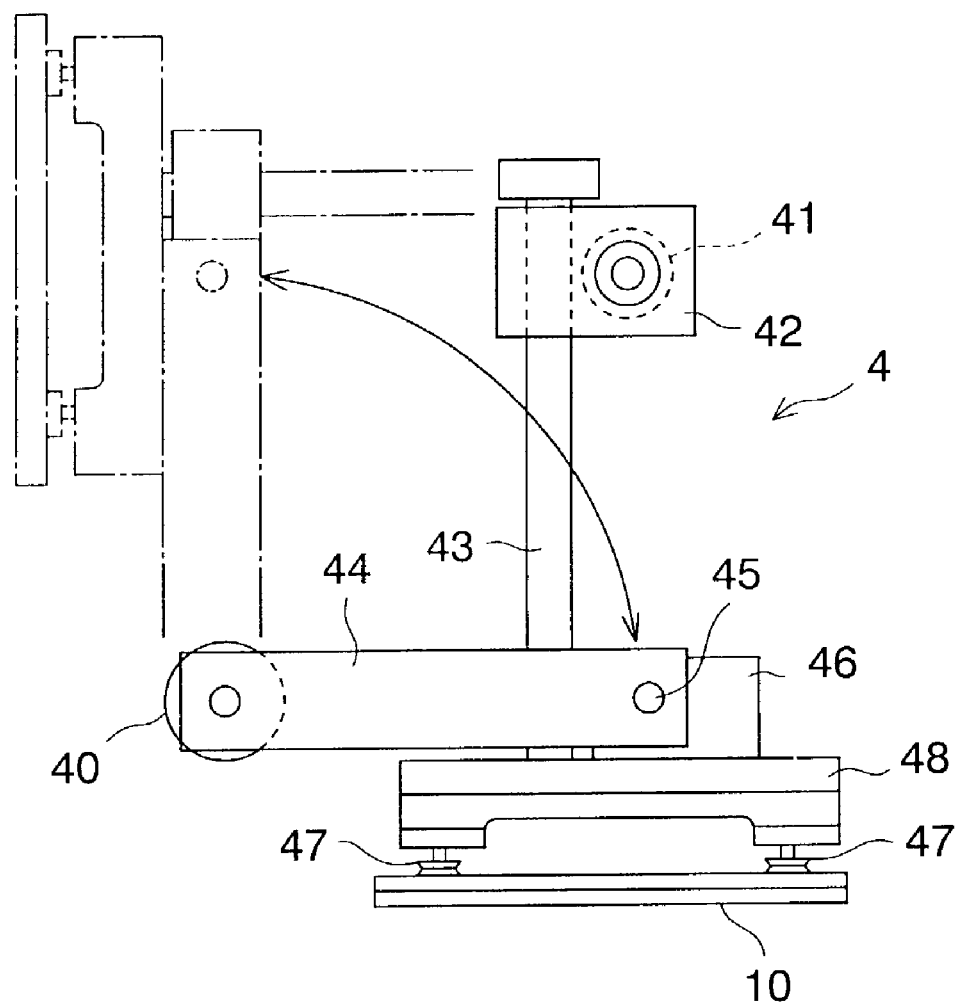
FIG. 5 is a schematic illustrating operation of the case unloading and inverting device of FIG. 3.

When the first supporting shaft 40 rotates 90 degrees, shown in FIG. 5, the case 10 held by the suction pads 47 of the case holding portion 48 is inverted 90 degrees as its upstanding state maintained.

Then, at this inverted position, the case 10 is opened by the case opening device 5 to be spread flat, shown by a dash-and-dot line in FIG. 1.

Thus, the case opening device 5 can be disposed at a position in close proximity to the upstream end of the case conveyor 2, and opening of the case 10 can be conducted at the position in close proximity to the upstream end of the case conveyor 2. As a result, the whole length of the case conveyor 2 and thus the whole length L of the apparatus 1 can be shortened, thereby making the whole apparatus compact.

The case opening device 5 operates as follows:

At the inverted position where the case 10 is inverted upstandingly by the case unloading and inverting device 4, the back portion 11c of the case 10 is supported from below by the suction pad 57 of the case opening device 5, shown in FIG. 6. Also, at this time, the levers 51, 52 of the case opening device 5 are rotated downwardly to be open in a waiting state (not shown).

Then, each lever 51, 52 rotates upwardly around the axial center line 50. Thereby, the front surface of the case 10 is suction-held by the suction pads 53, 54 of the levers 51, 52, and the end surface of the case body 11 is engaged with a pair of claw members 55, 56, shown in FIG. 6.

Figure 7:
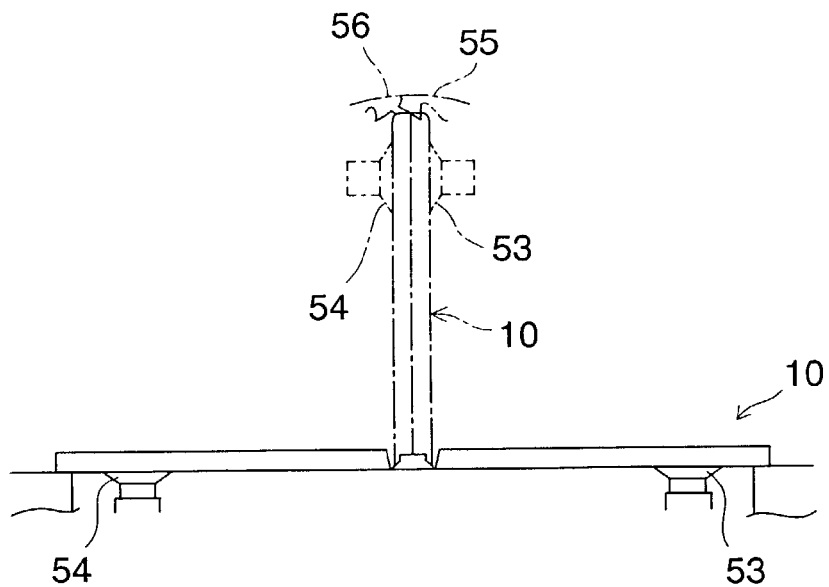
FIG. 7 is a schematic illustrating operation of the case opening device.

From this state, each lever 51, 52 rotates downwardly around the axial center line 50. Then, the suction pads 53, 54 and the claw members 55, 56 rotates downwardly along with the levers 51, 52. Thereby, the claw members 55, 56 disengage the engaging state of the case body 11, and as a result, shown in FIG. 7, the suction pads 53, 54 open the case 10 to be spread open.

Figure 10:
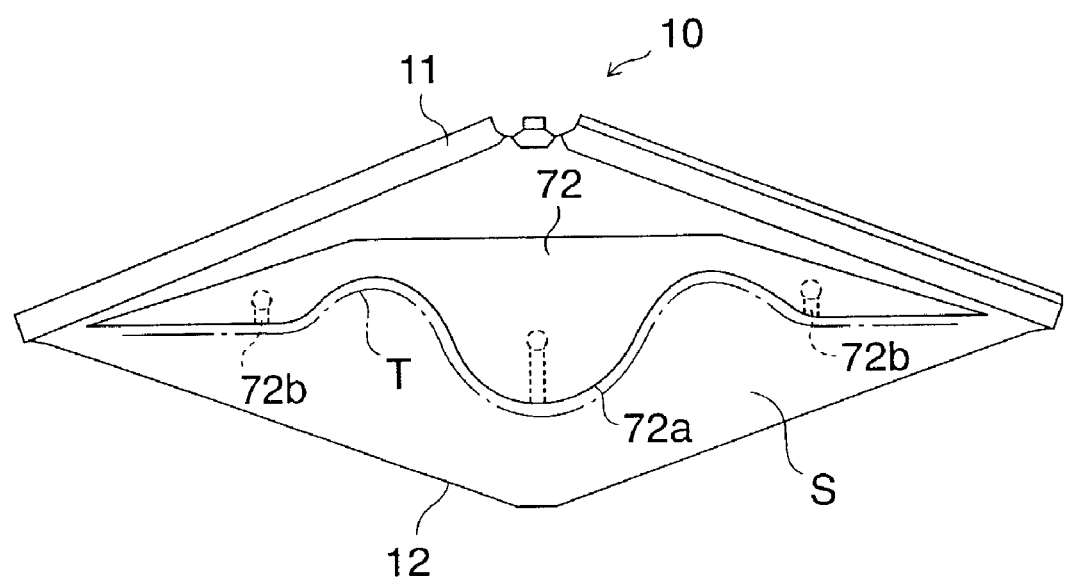
FIG. 10 is a schematic illustrating operation of the title sheet inserting device.

Then, the arm member 8 moves the case 10, which has been spread open, to the title sheet inserting station. At this title sheet inserting station, the title sheet inserting device 7 inserts a title sheet T into the transparent cover sheet 12 of the case 10. More specifically, shown in FIG. 9, first, a title sheet T is placed between the upper mold 72 and the lower mold 73 that are located away from each other. Then, the upper mold 72 moves upwardly to sandwich the title sheet T between the upper mold 72 and the lower mold 73 to make the title sheet T a wavy corrugated form (see the dash-and-dot line of FIG. 9). At this time, the air passages 72b suction-hold the title sheet T. Thereafter, the lower mold 73 moves downwardly. Then, the upper mold 72 holding the title sheet T enters a rhombic insertion space S shown in FIG. 10, formed between the cover sheet 12 and the case body 11, which has been deformed in a flat, reversed V-shape. Then, the air passages 72b eject compressed air to put the title sheet T in the insertion space S. Thereafter, the upper mold 72 moves backwardly.

Figure 11:
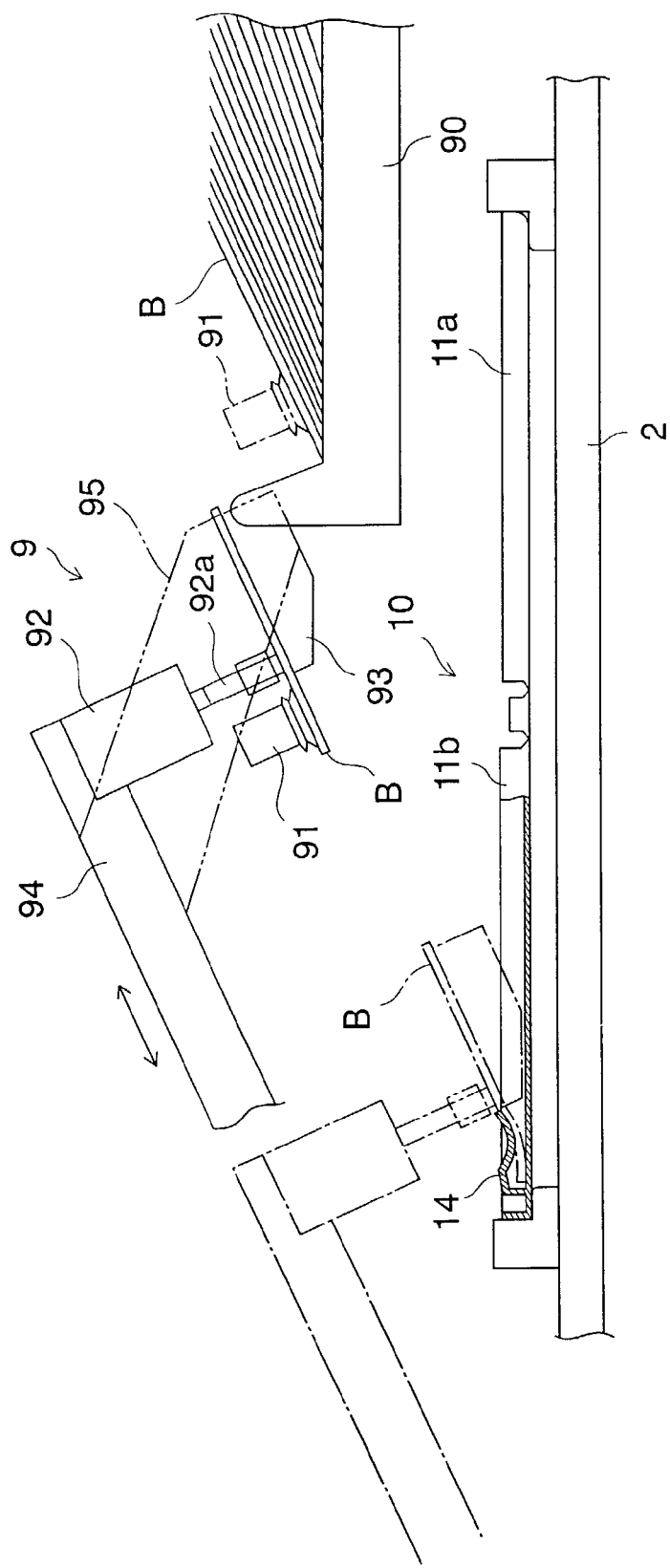
FIG. 11 is a side view of the booklet loading device of the optical disk loading apparatus.

After completion of title sheet insertion, the arm member 8 moves the case 10 back on the case conveyor 2. Then, the booklet loading device 9 loads a booklet B into the engaging claws 14 of the case 10. In the booklet loading device 9, as shown in FIG. 11, by moving the movable rod 94 back and forth, a booklet B is suction-held by the suction pad 91 and then, it is pinched between the piston rod 92a of the piston 92 and the base plate 94. Thereafter, the piston 92 moves to the engaging claws 14 of the case 10 by the movement of the rod 94, and the booklet B is inserted into the engaging claws 14.

Next, the first optical disk loading device 6 loads the first optical disk D1 into the case 10. As shown in FIG. 8, from the condition that the first optical disk D1 is held by the suction portion 61 of the first optical disk loading device 6, the movable rod 60 moves to the case 10 and then moves downwardly. Thus, the suction portion 61 loads the first optical disk D1 into the case 10.

At this time, the sensor 65 detects the detection plate 62 at the upper end of the movable rod 60 during the optical disk loading. Thus, mis-loading of the optical disk by the suction portion 61 can be detected. In this case, the detection as to whether the optical disk is securely loaded into the case can be conducted at the time of loading the optical disk, which eliminates the necessity for providing a detecting station discretely. Thereby, the whole length L of the case conveyor and thus the apparatus can be shortened. Also, in this case, whether the optical disk is loaded into the case is detected by the height position of the detection plate 62 or the height of the movable rod 60, and thus, detection of the optical disk loading can be securely conducted.

Then, the second optical disk loading device 6' loads the second optical disk D2 into the tray 16 of the case 10. In this loading process as well, whether the optical disk is securely loaded into the tray 16 is detected by a sensor (not shown). This eliminates the need to provide a detection station separately, thereby reducing the length L of the case conveyor and thus the whole apparatus.

Also, in this case, the first and second optical disk loading devices 6, 6' are disposed on the opposite sides of the case conveyor 2. Thus, the first and second optical disk loading devices 6, 6' can be located in close proximity to each other along the conveying direction of the case conveyor 2 or can be overlapped each other, thereby reducing the occupying length of the first and second optical disk loading devices 6, 6' along the length of the case conveyor 2. In such a manner, the length L of the case conveyor 2 and thus the apparatus 1 can be shortened, thereby making the whole apparatus more compact.

Thereafter, the case closing device 25 closes the case 10 with the first and second optical disks D1, D2 loaded. Then, the pusher 26 rejects the defectives and only the acceptable cases 10 are conveyed by the conveyor 27.

In such a way, a series of optical disk loading processes are completed.

Those skilled in the art to which the invention pertains may make modifications and other embodiments employing the principles of this invention without departing from its spirit or essential characteristics particularly upon considering the foregoing teachings. The described embodiments and examples are to be considered in all respects only as illustrative and not restrictive. The scope of the invention is, therefore, indicated by the appended claims rather than by the foregoing description. Consequently, while the invention has been described with reference to particular embodiments and examples, modifications of structure, sequence, materials and the like would be apparent to those skilled in the art, yet fall within the scope of the invention.

What is claimed is:

1. An optical disk loading apparatus for unloading a case from a case stacking device where a plurality of openable and closable cases each having a transparent cover sheet are stacked with each case closed and placed upstandingly, transferring an unloaded case via a case conveyor, and loading an optical disk into the case, said apparatus comprising:

a case unloading and inverting device that unloads a case from said case stacking device and inverts the case 90 degrees with its upstanding state maintained;

a case opening device that opens the case to a flat state at its inverted position;

a title sheet inserting device that inserts a title sheet into the transparent cover sheet of the opened case;

a booklet loading device that loads a booklet into the case having the title sheet inserted; and an optical disk loading device that loads an optical disk into the case having the booklet inserted.

2. The optical disk loading apparatus according to claim 1, wherein said case unloading and inverting device comprising:

a first rotatable supporting shaft extending upwardly;

a second supporting shaft extending upwardly and located, away from said first supporting shaft;

a block member having a laterally extending through hole and rotatably supported by said second supporting shaft;

a rod member slidably supported in said laterally extending through hole of said block member;

a first link member fixedly connected to said first supporting shaft;

a second link member fixedly connected to a distal end of said rod member and rotatably connected to a distal end portion of said first link member through a connecting member; and a case holding portion having a suction pad to suction-hold said case and fixedly connected to a distal end of said rod member.

3. The optical disk loading apparatus according to claim 1, wherein said optical disk loading device is comprised of a first loading device provided on one aide of said case conveyor to load a first optical disk and a second loading device provided on the other side of said case conveyor to load a second optical disk.

4. The optical disk loading apparatus according to claim 1, wherein said case stacking device comprising:

a case supplying conveyor adapted to supply a case to said case unloading and inverting device, said case supplying conveyor being tilted in such a way that the downstream end is located lower then the upstream end;

a first feeding conveyor adapted to feed a case to said case supplying conveyor, said first feeding conveyor has a first conveying surface tilted in such a way that the upstream end is located lower than the downstream end, which is provided along said case supplying conveyor, said conveying surface having a plurality of closed cases stacked upstandingly thereon; and a second feeding conveyor operatable synchronized with said first feeding conveyor, said second feeding conveyor having a second conveying surface that is perpendicular to said first conveying surface of said first feeding conveyor and extends to said case supplying conveyor.

5. The optical disk loading apparatus according to claim 1, wherein said optical disk loading device has a sensor to detect that the optical disk has been loaded into the case.

6. The optical disk loading apparatus according to claim 5, wherein said optical disk loading device has a suction pad to suction-hold the optical disk and a movable rod adapted to move maid suction pad upwardly and downwardly, and wherein said sensor is a position detecting sensor that detects the height position of said movable rod.

7. The optical disk loading apparatus according to claim 3, wherein said optical disk loading device has a sensor to detect that the optical disk has been loaded into the case.

8. The optical disk loading apparatus according to claim 7, wherein said optical disk loading device has a suction pad to suction-hold the optical disk and a movable rod adapted to move said suction pad upwardly and downwardly, and wherein said sensor is a position detecting sensor that detects the height position of said movable rod.

* * * * *

UNITED STATES PATENT AND TRADEMARK OFFICE
CERTIFICATE OF CORRECTION

PATENT NO. : 6,961,290 B2
DATED : November 1, 2005
INVENTOR(S) : Yamamoto

It is certified that error appears in the above-identified patent and that said Letters Patent is hereby corrected as shown below:

<u>Column 8,</u>
Line 62, after " located", delete ",";

<u>Column 9,</u>
Line 12, after "one", replace "aide" with -- side --;
Line 12, after "lower", replace "then" with -- than --;

<u>Column 10,</u>
Line 15, after "move", replace "maid" with -- said --.

Signed and Sealed this

Eleventh Day of April, 2006

JON W. DUDAS
*Director of the United States Patent and Trademark Office*